United States Patent [19]
Sumino et al.

[11] Patent Number: 5,377,889
[45] Date of Patent: Jan. 3, 1995

[54] AUTOMOBILE ROOF CARRIER

[75] Inventors: Kozo Sumino, Funabashi; Masaaki Toya, Chiryu, both of Japan

[73] Assignee: Autobacs Seven Co., Ltd., Toyonaka, Japan

[21] Appl. No.: 115,900

[22] Filed: Sep. 1, 1993

[30] Foreign Application Priority Data

Sep. 10, 1992 [JP] Japan .............................. 4-070069[U]
Sep. 10, 1992 [JP] Japan .............................. 4-070070[U]

[51] Int. Cl.⁶ .............................................. B60R 9/00
[52] U.S. Cl. .................................... 224/315; 224/309; 224/324; 224/917; 248/206.5; 248/553
[58] Field of Search ............... 224/324, 917, 309, 315; 248/551, 553, 683, 206.5

[56] References Cited

U.S. PATENT DOCUMENTS 4,747,529  5/1988  Hinderaker et al.
5,312,030  5/1994  Baravalle ............................ 224/324

FOREIGN PATENT DOCUMENTS

0558992A1  8/1993  European Pat. Off.
1466472    1/1967  France .
2423565   11/1975  Germany .
3-42446    4/1991  Japan .

Primary Examiner—Linda J. Sholl
Attorney, Agent, or Firm—David G. Conlin; John L. Welch

[57] ABSTRACT

An automobile roof carrier of the invention is mainly composed of a magnetic base portion, a gripping portion for removal, a covering member and a loading article holding portion. The covering member is integrally jointed over the magnetic base portion while the magnetic base portion is covered by the covering member except in the attractive surface of the magnetic base portion and the gripping portion for removal. Combined integrally in the upper part of the covering member is a loading article holding portion which is able to be opened and closed. A supplementary cover which is able to be opened and closed is attached to the covering member so that the gripping portion for removal may be hidden and exposed. There is provided a first locking mechanism for maintaining the closed state of the supplementary cover, whereas there is provided a second locking mechanism for maintaining the closed state of the loading article holding portion. A common key for releasing the locked states of these locking mechanisms is provided. The automobile roof carrier of the invention further includes means for preventing the degradation of appearance, increment of air flow resistance at driving, the reduction of contacting area with the roof and the like.

4 Claims, 17 Drawing Sheets

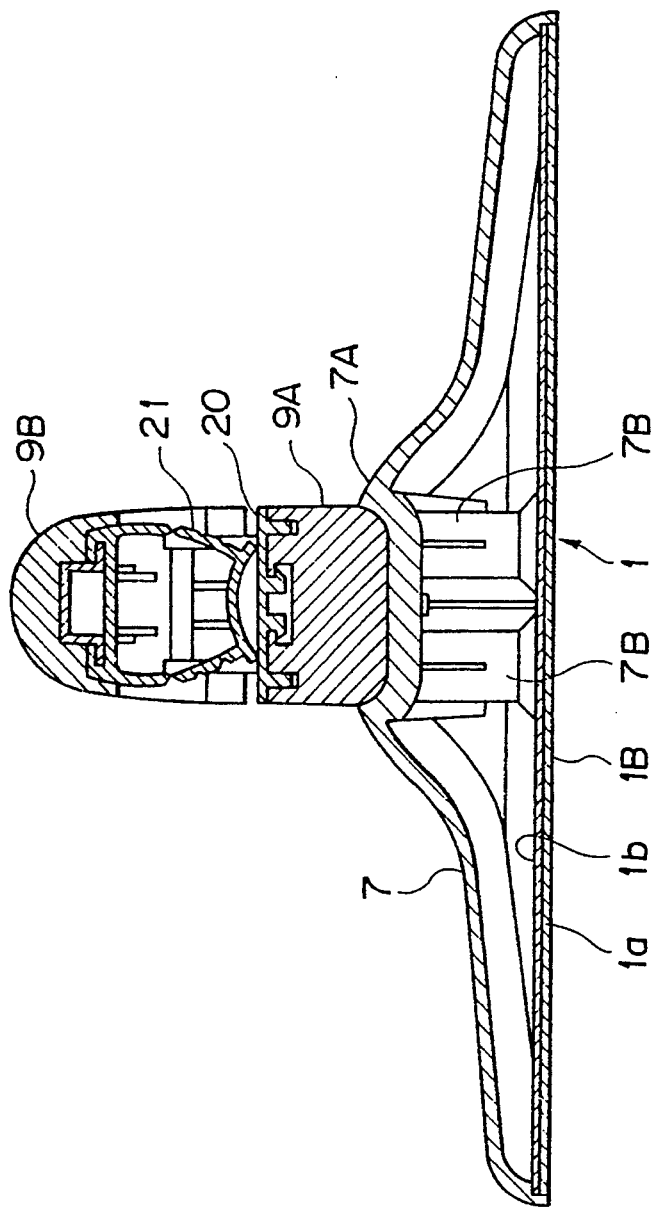

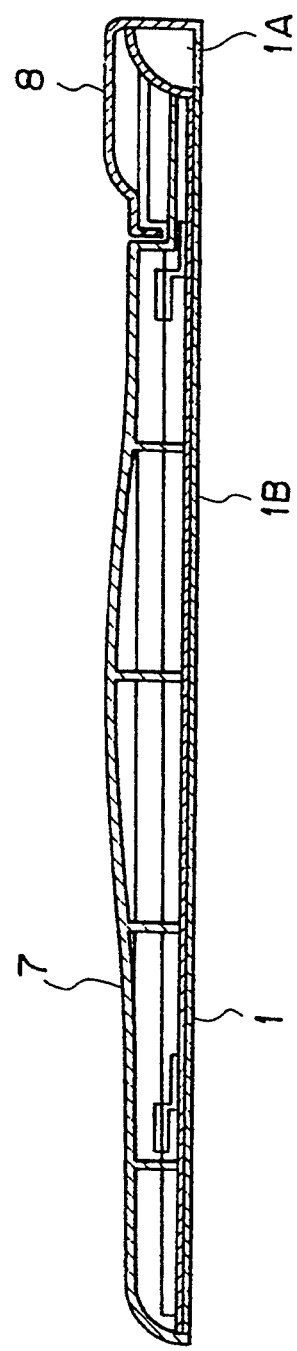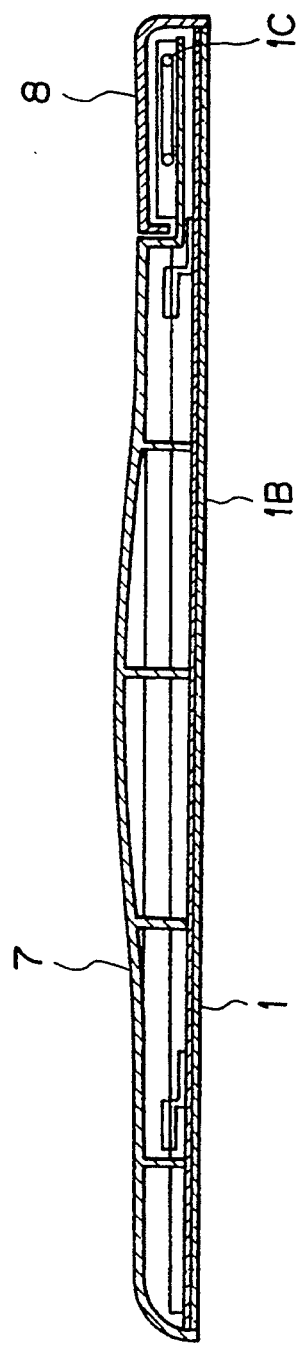

001
AUTOMOBILE ROOF CARRIER

BACKGROUND OF THE INVENTION

1. Field of the invention

The present invention relates to an automobile roof carrier for transporting long size articles such as skis.

2. Description of the Related Art

As a known example of roof carrier for automobiles for transporting long size articles such as skis, Japanese Utility Model Application Laid-Open Hei 3 No. 42446 discloses a ski carrier which is provided with a magnetic base that is attracted magnetically to the roof top of automobiles.

Referring to FIGS. 1 through 3, conventional ski carriers of this kind includes a magnetic base portion 1 that is attracted magnetically to a roof R of an automobile A. The magnetic base portion 1 is provided at an appropriate location of the outer peripheral portion thereof with a gripping portion 1A for removal. A semi-cylindrical block 2 is integrally joined on the top central portion of magnetic base portion 1 and is attached with a ski holder 5 in a rotatable and up-and-down movable manner by means of a pair of right and left studs 4, 4 that rotate forward and backward of the vehicle relative to block 2 on a rotating axis as the center thereof from a lying position to an upright position. At the upright position of ski holder 5, a pair of skis 6 are fit into a pair of fitting grooves 5A, 5A formed side by side in ski holder 5. At this time, ski holder 5 is descended mainly due to the weight of skis 6 so that ski holder 5 is assured to be engaged at the upright position. Further, the engagement state can be released by lifting up ski holder 5 so that the holder 5 may be laid down.

In the prior art roof-topped ski carrier described above, attachment of skis 6 to ski holder 5 is performed by fitting skis 6 into ski fitting grooves 5A, 5A and thereafter binding them with a rubber strap (not shown) in an appropriate manner, whereas the rubber strap is unbound when the skis 6 are to be removed. Consequently, the operation of attachment and removal of skis 6 is complicated resulting in poor operativity. Besides, since skies 6 are fixed with a rubber strap, the fixing state can be released easily by a third person so that skis 6 are exposed to a danger of being stolen.

On the other hand, in a case where the ski carrier is not engaged, the ski carrier can be removed from roof R of automobile A by hooking fingers on gripping portion 1A for removal to pull up carrier base 1. At this time, the base is kept being pulled up so that the attracted area of magnetic base portion 1 to roof R is reduced gradually.

However, the prior art ski carrier can be easily detached from roof R since gripping portion 1A for removal is also exposed outside. Accordingly, the ski carrier itself is exposed to a danger of being stolen.

In conclusion, the prior art roof-topped ski carriers described above have no anti-theft measure. As a result, not only the skis but also the roof carrier itself might be stolen, so that the carrier suffers from low security.

SUMMARY OF THE INVENTION

The present invention has been achieved to eliminate the above problems. A first object of the present invention is to solve the following problems: that is, low operativity due to complicated attachment and removal in attaching and removing articles to be loaded such as skies; the possibility and fear of the roof carrier and skies being stolen since no anti-theft measure is adopted.

Further, if, in order to surely avoiding the theft of the loaded articles and the roof carrier itself and improve the security, any anti-theft measure is taken, degradation of appearance of the roof carrier at use might occur. Besides, increment of air flow resistance at driving, or lowering of attraction of the magnetic base portion accompanied by the reduction of the contact area of the magnetic base portion with the roof may take place. Therefore, it is a second object of the present invention to provide means for solving such problems.

The present invention has been achieved to solve the above problems, and a first aspect and feature of the present invention resides in an automobile roof carrier which comprises: a magnetic base portion, magnetically attracted onto an upper surface of a roof of an automobile; a gripping portion for removal formed in an appropriate position of the magnetic base portion; a covering member, disposed over the magnetic base portion and integrally united therewith so as to cover the portion other than the attracted surface of the magnetic base portion and the gripping portion for removal; a loading article holding portion, disposed above the covering member, integrally jointed thereto and having means to be opened and closed to hold said articles; an auxiliary cover attached to the covering member so as to be opened and closed for lidding the gripping portion for removal from the top; a first locking mechanism disposed in the auxiliary cover to be locked for maintaining the closed state of the auxiliary cover when the auxiliary cover is closed; a second locking mechanism disposed in the loading article holding portion to be locked for maintaining the closed state of said loading article holding portion when the loading article holding portion is closed; and a common key for unlocking the first and second locking mechanisms.

According to the present invention, in a case where the roof carrier is attached to an automobile roof by magnetic attraction of the magnetic base portion, the gripping portion for removal can be concealed by the auxiliary cover, and the hidden state of the gripping portion for removal can be maintained by the first locking mechanism.

Removal of the roof carrier from the roof can be carried out by unlocking the first locking mechanism with the unlocking key to allow the auxiliary cover to be opened, exposing the gripping portion for removal by opening the auxiliary cover, then pulling up the gripping portion for removal while gripping it with fingers. The removal of the roof carrier will be completed by continuing the pulling operation to gradually reduce the attracted area of the magnetic base portion to the roof.

On the other hand, attachment of the loading articles such as skis to the roof carrier is carried out by a simple single touch operation of releasing the loading article holding portion, setting the skis or any other articles on the released loading article holding portion, then returning the loading article holding portion to the closing position. The holding of the thus loaded article is maintained by the lock of the second locking mechanism.

Detachment of the skis or any other articles can be performed by unlocking the second locking mechanism with the unlocking key to allow the loading article holding portion to be released and releasing the loading article holding portion.

A second aspect and feature of the present invention is to provide an automobile roof carrier which comprises: a magnetic base portion, magnetically attracted onto an upper surface of a roof of an automobile; a gripping portion for removal formed in an appropriate position of the magnetic base portion; a covering member, disposed over the magnetic base portion and integrally united therewith so as to cover the portion other than the attracted surface of the magnetic base portion and the gripping portion for removal; a loading article holding portion, disposed above the covering member, integrally jointed thereto and having means to be opened and closed to hold said articles; an auxiliary cover attached to the covering member so as to be opened and closed for lidding the gripping portion for removal from the top; a first locking mechanism disposed in the auxiliary cover to be locked for maintaining the closed state of said auxiliary cover when the auxiliary cover is closed; a second locking mechanism disposed in the loading article holding portion to be locked for maintaining the closed state of the loading article holding portion when the loading article holding portion is closed; a common key for unlocking the first and second locking mechanisms; a plurality of first jointing members each having catching means formed with a cutout portion, and disposed in appropriate, peripheral positions on the magnetic base portion; and a plurality of second jointing members, disposed on the under surface of the covering member in positions corresponding to the respective first jointing members, extending downward, each constructed of a boss element and an interfering element attached to the lower end of the boss element, and is characterized in that the corresponding pairs of first and second jointing members are engaged such that the boss portions are inserted into the respective cutout portions when the magnetic base portion and the covering member is united integrally, and in each pair of the jointing members a clearance in a radial direction of the boss element between the inside edge of the cutout portion and the outside edge of the boss element is created across at least semicircular range.

In accordance with the present invention, a plurality of first and second Jointing members are jointed one another with a clearance therebetween in order to unite the magnetic base portion with the covering member in their periphery. Therefore, no closed sectional structure is created along the integrally uniting portion around the central portion of the magnetic base portion and the covering member, the part of the covering member existing between the first integrally uniting portion and the second integrally uniting portion, the second integrally uniting portion formed by the first jointing member and the second jointing member and the part of the magnetic base portion existing between the second integrally uniting portion and the first integrally uniting portion. That is, the flexibility of the covering member can be retained, and further, the relative shift between the first jointing member and the second jointing member can be absorbed by the clearance. Accordingly, in a case where the periphery of the magnetic base portion is curved as it is use along the curvature of the roof to be brought into uniform contact therewith, the curvature is transferred from the catching portion of the first Jointing member to the interfering portion of the second jointing member, and consequently the covering member arches following the curvature of the magnetic base portion due to its own flexibility. As a result, no clearance between the covering member and the magnetic base portion does arise around the periphery. In other words, even when the curvature of curved surface of the roof may change depending upon the make or the model of automobiles, the roof carrier of the invention can be mounted on the roof without exposing the peripheral portion of the magnetic base portion.

Loading articles to be carried by the automobile roof carrier of the invention include skies and sticks, surf-boards, snow-boards, mono-skies, wind-surfing boards and masts with sails, any other long size articles such as poles for sports equipment or for other objects.

BRIEF DESCRIPTION OF THE DRAWINGS

FIG. 8 is an enlarged sectional view taken along line 70—70 shown in FIG. 5;

FIG. 9A is an enlarged sectional view taken along line 80—80 shown in FIG. 5;

FIG. 9B is an enlarged sectional view showing a variation of the arrangement shown in FIG. 9A;

DESCRIPTION OF THE PREFERRED EMBODIMENTS

An embodiment of the present invention will hereinafter be described with reference to the accompanying drawings.

Figure 4:
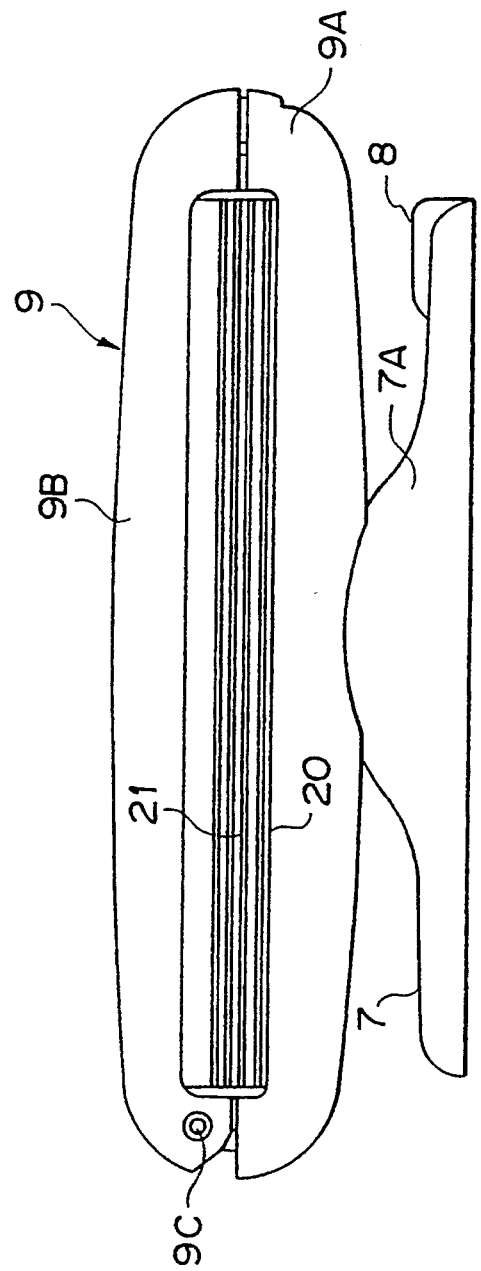
FIG. 4 is a front view showing an embodiment of an automobile roof carrier according to the present invention.
Figure 5:
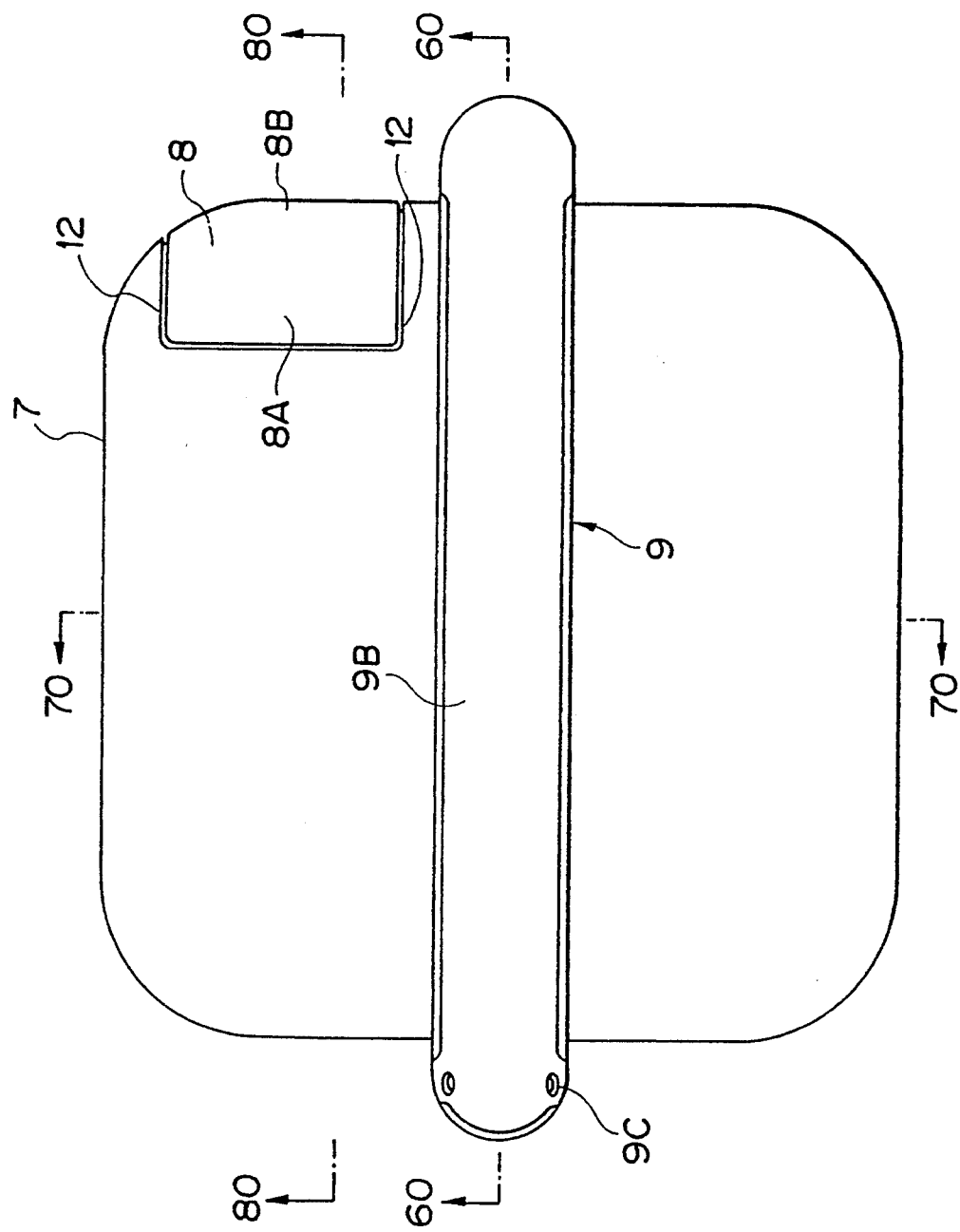
FIG. 5 is a plan view showing the carrier shown in FIG. 4.
Figure 6:
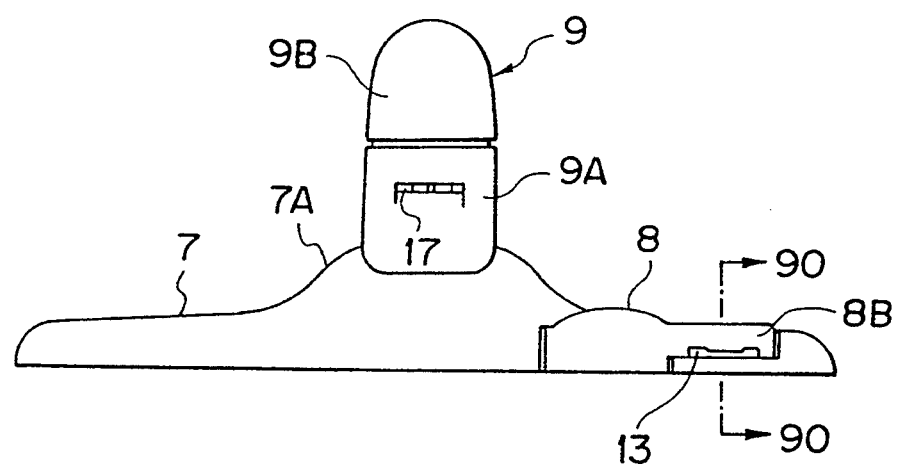
FIG. 6 is a right side view showing the carrier shown in FIG. 4.
Figure 7:
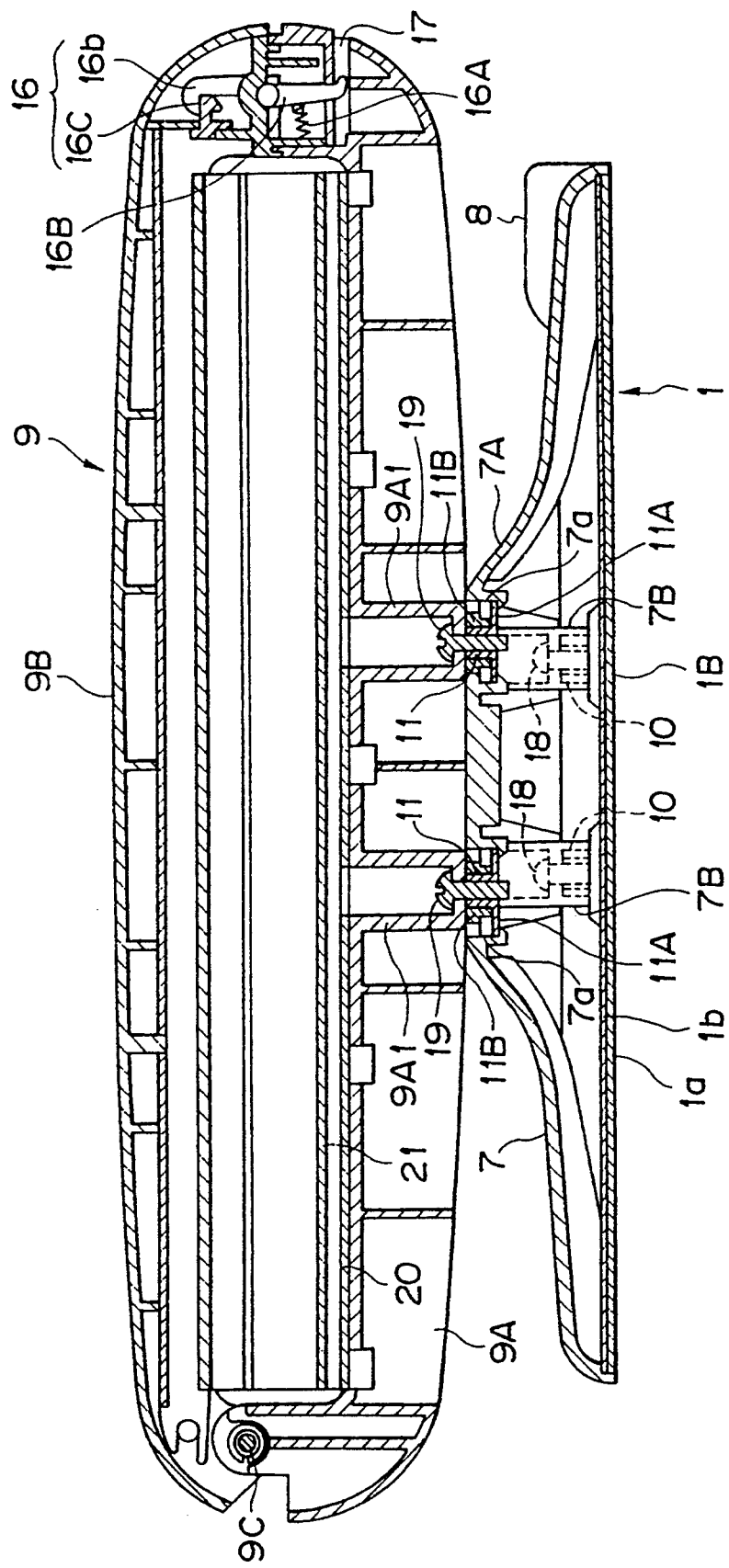
FIG. 7 is an enlarged sectional view taken along line 60—60 shown in FIG. 5.

FIGS. 4, 5 and 6 are respectively front, plan and right side views of an embodiment of the present invention. FIG. 7 is an enlarged sectional view taken along line 60—60 shown in FIG. 5. FIG. 8 is an enlarged sectional view taken along line 70—70 shown in FIG. 5. FIG. 9A is an enlarged sectional view taken along line 80—80 shown in FIG. 5. FIG. 9B shows a variation of the arrangement shown in FIG. 9A. In FIG. 9A, a gripping portion 1A is constructed of a recessed or caverned structure whereas a drawable and retractable handle type gripping portion 1C is provided in the variation shown in FIG. 9B. In these drawings, the same reference numeral will be allotted to refer to identical or corresponding components with those in the above prior art example.

Figure 1:
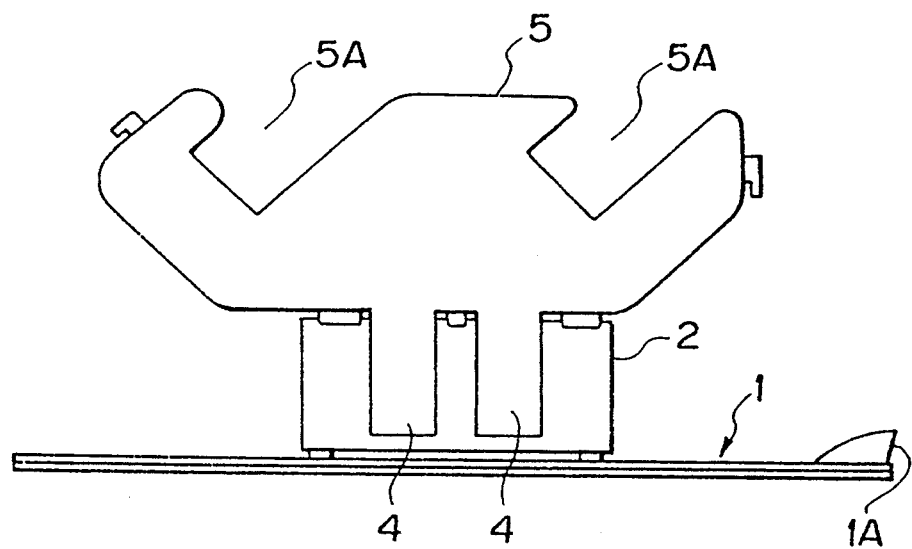
FIG. 1 is a front view showing an example of prior art automobile roof carrier.
Figure 2:
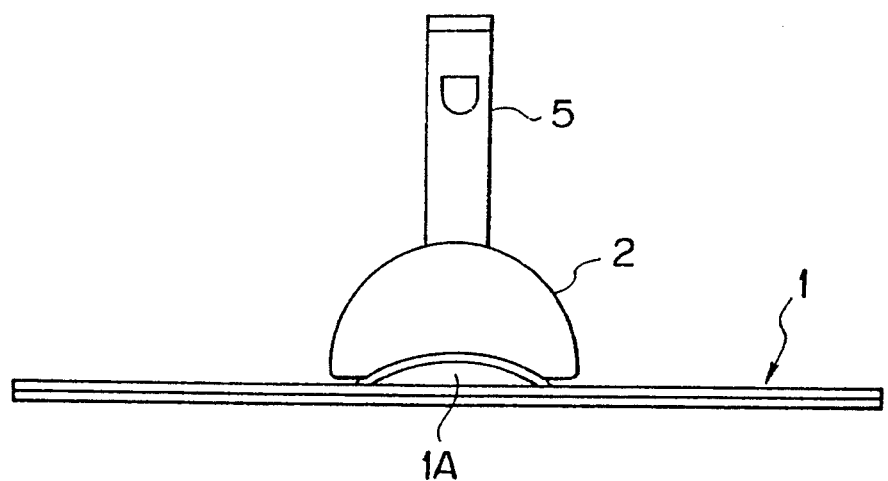
FIG. 2 is a right side view of the carrier shown in FIG. 1.
Figure 3:
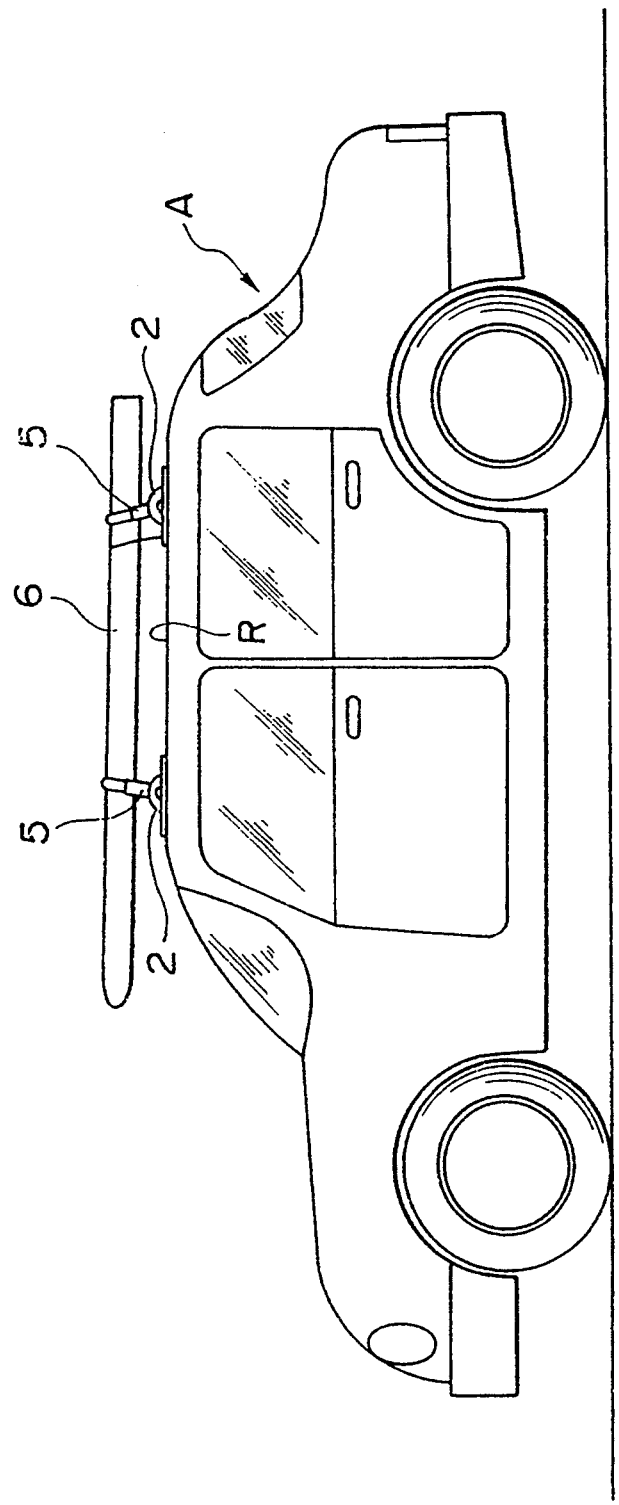
FIG. 3 is a side view of the carrier shown in FIG. 1 while it is engaged.

Referring to FIGS. 4 through 8, a roof carrier of the embodiment includes a magnetic base portion 1 that is attracted magnetically to a roof R of an automobile A (see FIG. 3). The magnetic base portion 1 is provided at an appropriate location of the outer peripheral portion thereof with a hollowed gripping portion 1A for removal. The portion of magnetic base portion 1 other than an attracted face 1B and gripping portion 1A for removal is covered by a covering member 7, which is integrally jointed on the upper side of magnetic base portion 1. An auxiliary cover 8 that covers gripping portion 1A from the top side thereof is provided on the covering member 7 so as to be opened and closed while a loading article holding portion 9 that can be opened and closed is integrally joined onto the upper side of covering member 7.

Figure 10:
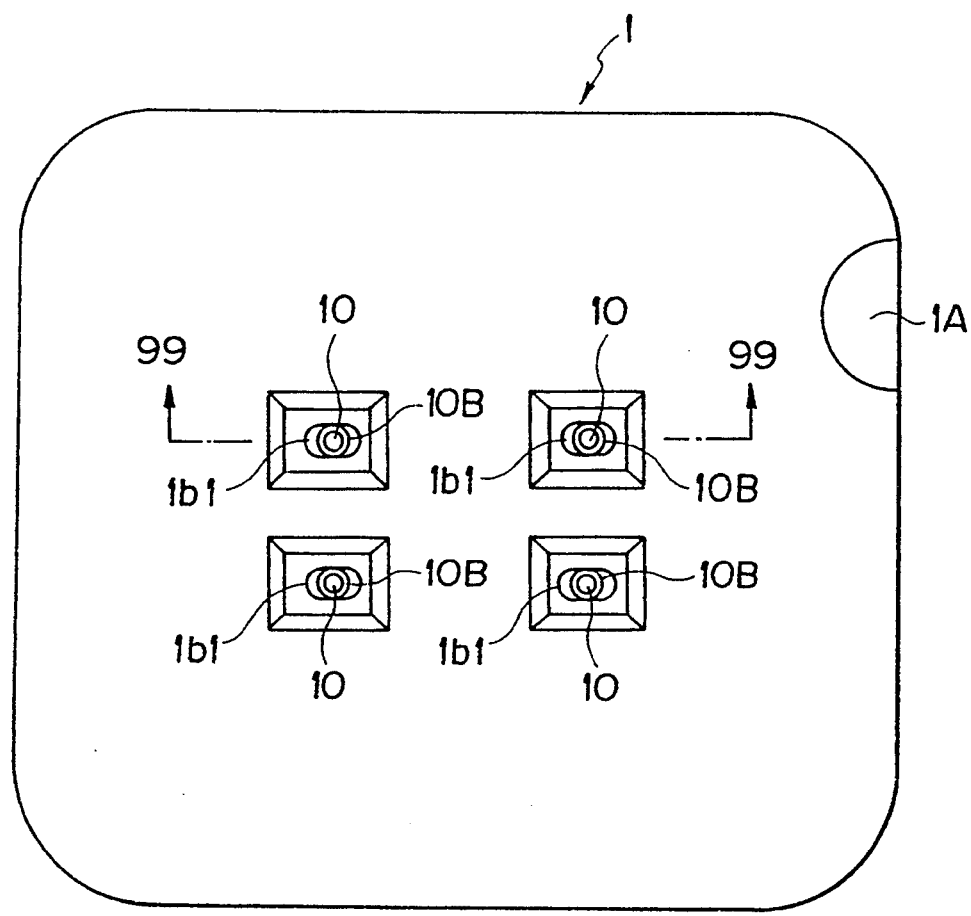
FIG. 10 is a plan view showing a magnetic base portion of a carrier of the present invention.
Figure 11:
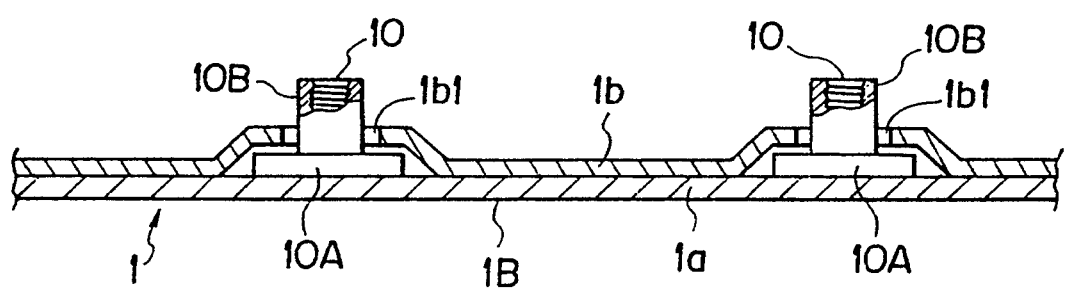
FIG. 11 is an enlarged sectional view taken along line 99—99 shown in FIG. 10.

As shown in FIGS. 10 and 11, magnetic base portion 1 is constructed of a thin magnetic plate 1a and a metallic, thin upper plate 1b integrally bounded on the upper surface of the magnetic plate 1a while the integrated plate is formed in a substantial square with its four corners rounded. In the center portion of magnetic base portion 1 four, flange-equipped internal thread members 10, 10 . . . are fixed in such a manner that each flange portion 10A is held between 1a and upper plate 1b with its axial portion 10B being projected upward through a corresponding through-hole 1b1 formed in upper plate 1b. Further, upper plate 1b is made to swell upward at one peripheral portion of magnetic base portion 1 while magnetic plate 1a for the corresponding portion is removed, so that gripping portion 1A is formed.

As shown in FIGS. 7, 8, 9A and 9B, covering member 7, made of a resin, is formed by an upside-down tray-shaped structure having a size that allows the portion of magnetic base portion 1 other than magnetic attractive face 1B to be covered relatively closely. In the central portion of covering member 7 a mounting portion 7A is formed so as to be projected upward in order to mount loading article holding portion 9. In addition, two, flange-equipped internal thread members 11, 11, each composed of a flange portion 11A and an axial portion 11B, are fit upwardly in corresponding through-holes 7a formed in mounting portion 7A with flange portions 11A abutted against the lower face of mounting portion 7A while each top end of the axial portions 11B reaches the upper boundary level of through hole 7a. The covering member 7 further includes four, holding cylinders 7B. 7B . . . formed vertically. Each holding cylinder 7B holds an external thread member 18 (therefore, there are in total four external thread members 18, 18 . . . but only two external thread members 18, 18 are shown in FIG. 7) which is screwed in the vicinity of the corresponding flange-equipped internal thread member 11 into the corresponding flange-equipped internal member 10 on magnetic base portion 1. An auxiliary cover 8 is attached to a corresponding position of gripping portion 1A or 1C in magnetic base portion 1 so as to be able to be opened and closed.

As is apparent from FIG. 5, the aforementioned auxiliary cover 8 is attached at a proximal end 8A thereof to covering member 7 rotatably in a vertical direction by means of pins 12, 12. As is shown in FIG. 6, the cover is formed at a distal end 8B with a first key insertion hole 13 while provided with a hook 14 projecting horizontally inward inside the distal end 8B. The closed state of auxiliary cover 8 is adapted to be clutched or locked by a first locking mechanism 15.

First locking mechanism 15, as is shown in FIGS. 12A and 12B and FIGS. 13A and 13B, is provided so as to be able to shift in directions of arrows w1 and w2 over the portion of covering member 7 to be covered when auxiliary cover 8 is closed. The first locking mechanism 15 is composed of a latch 15A that is kept all the time at a locking position shown by a solid line under the pressure of an elastic member (not shown) and the aforementioned hook 14 that will engage a bevel 15a formed on the upper side of an operative end of latch 15A.

Figure 12A:
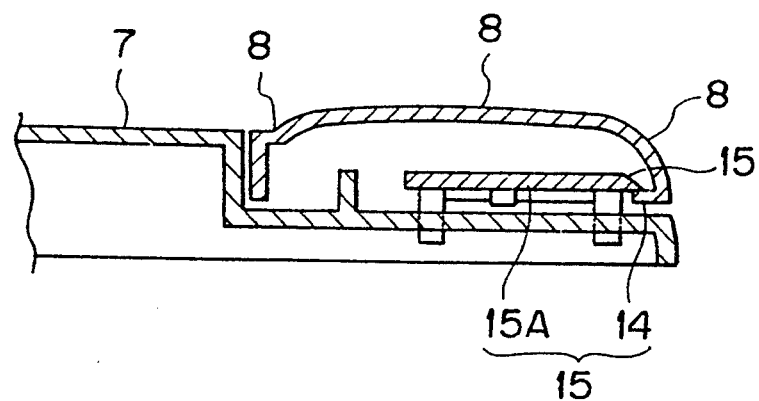
FIG. 12A is an enlarged sectional view taken along line 90—90 shown in FIG. 6.
Figure 12B:
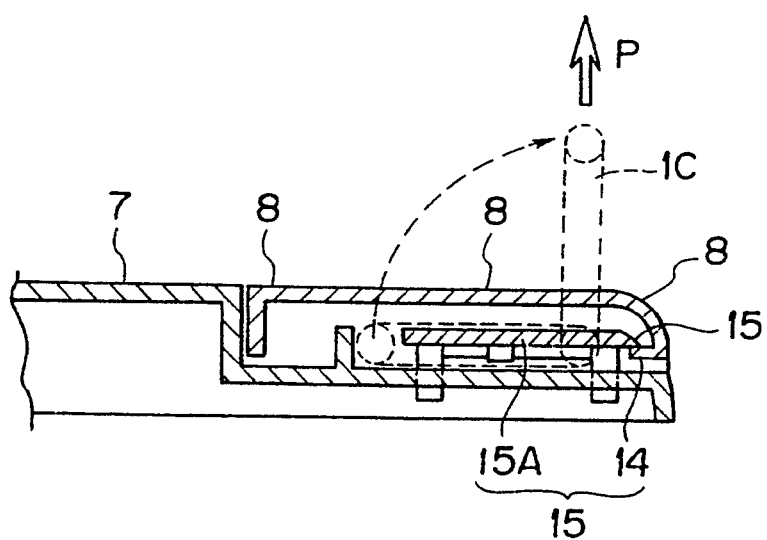
FIG. 12B is an enlarged sectional view showing a variation of the arrangement shown in FIG. 12A.
Figure 13A:
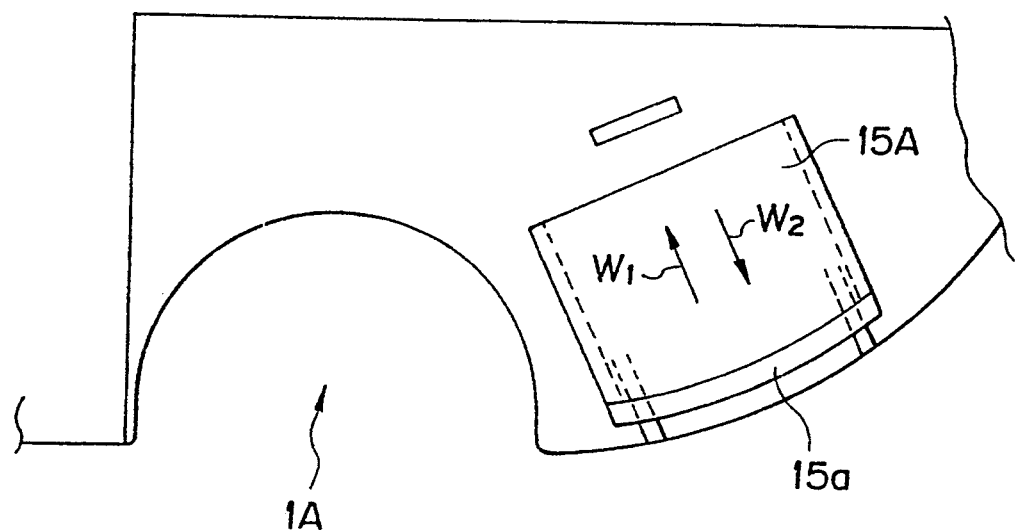
FIG. 13A is a plan view showing the arrangement of FIG. 12A with an auxiliary cover being removed.
Figure 13B:
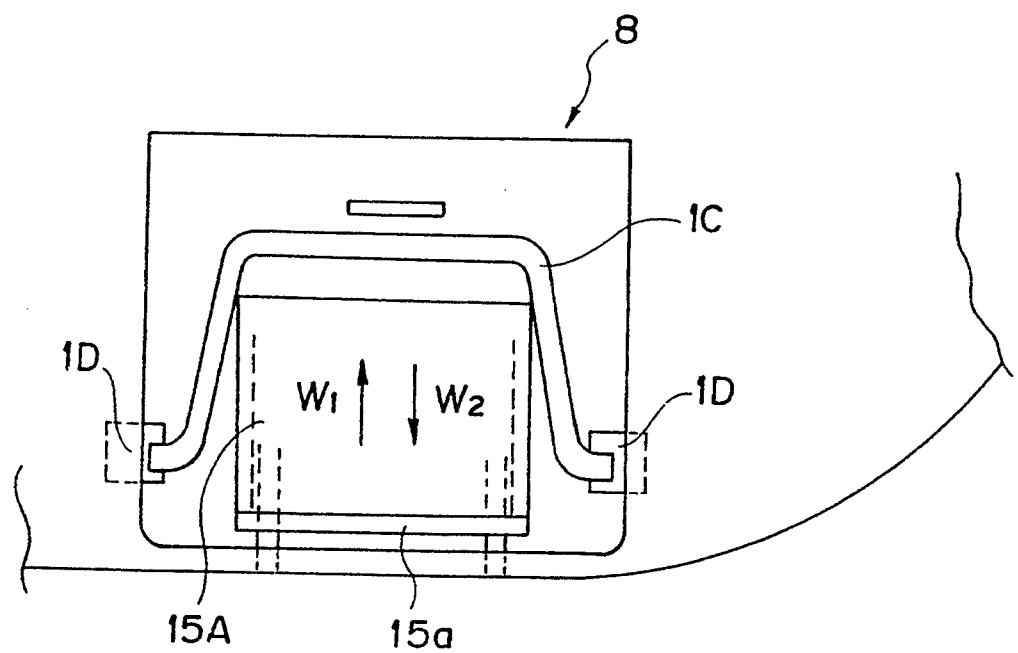
FIG. 13B is an enlarged sectional view showing a variation of the arrangement shown in FIG. 13A.

Among the structures described heretofore, FIGS. 12B and 13B shows a variation of FIGS. 12A and 13A. Main difference in the embodiment shown by FIGS. 12B and 13B from that of FIGS. 12A and 13A is that the embodiment in FIGS. 12A and 13A is provided with a hollowed gripping portion 1A whereas the embodiment of FIGS. 12B and 13B is provided with a drawable and retractable handle type gripping portion 1C. This handle type gripping portion 1C is held rotatably at both side ends by axial end supporting portions 1D, 1D as shown in FIG. 13B, and when auxiliary cover 8 is closed the handle is laid down or retracted inside auxiliary cover 8. When auxiliary cover 8 is unlocked to be opened, the gripping portion 1C is uprighted as indicated by broken line in FIG. 12B. In this state, an operator can grip the gripping portion 1C by his/her hand and may easily draw up the magnetic base portion 1 in a direction of arrow P to detach it from the roof. Further, in the embodiment depicted in FIGS. 9A, 12A and 13A, since the gripping portion 1A is formed by a hollow structure to swell out upward, the auxiliary cover 8 must be formed bulged to cover the gripping portion. In contrast to this, in the embodiment shown in FIGS. 9B, 12B and 13B, since the handle type gripping portion 1C can be accommodated inside auxiliary cover 8 as the handle is laid down when it is not used, the surface of auxiliary cover 8 can be generally leveled with that of the other part of covering member 7 without steps as shown in the above-mentioned figures. Accordingly, the structure serves to reduce wind resistance as well as is preferable in view of the outer appearance of the carrier.

A loading article holding portion 9 comprises a fixed member 9A located at lower side and a movable member 9B located at upper side as shown in FIGS. 4 through 8. The proximal end portions of fixed member 9A and movable member 9B are hinged each other through a horizontally extended pin 9C whereas a second locking mechanism 16 is provided for the respective distal end portions of fixed member 9A and movable member 9B to lock one another maintaining the closed position. On both sides in the center portion of fixed member 9A a pair of bottomed holding cylinders 9A1, 9A1 are formed vertically which hold respective external thread members 19, 19 that in turn are screwed into corresponding flange-equipped internal thread members 11, 11 on covering member 7. A second key insertion hole 17 is formed on the distal end side of fixed member 9A. A lower side pad 20 formed of elastic material is attached onto the upper face of fixed member 9A whereas an upper side pad 21 formed of elastic material is attached onto the lower face of movable member 9B.

As is apparent from FIG. 7, the second locking mechanism 16 comprises a lever-like latch 16B which is rotatably attached to fixed member 9A and kept at all times at a locking position shown by solid line by the pressure of a spring 16A and a hook 16C disposed in movable member 9B in correspondence with arc surface 16b formed at an upper, operative end of latch 16B. The aforementioned second key insertion hole 17 is formed near the force point side of latch 16B.

Meanwhile, the joint between magnetic base portion 1 and covering member 7 is arranged, as shown in FIG. 7, by placing covering member 7 over magnetic base portion 1 while four external thread members 18, 18 ... are screwed into respective internal thread members 10, 10 ... More specifically, each upper end portion of axial part 10B of flange-equipped internal thread member 10 disposed on magnetic base portion 1 (there are in total four internal thread members 10, 10 ... but only two internal thread members 10, 10 are shown in FIG. 7) is fit into respective holding cylinder 7B. Thus fit flange-equipped internal thread members 10, 10 ... are engaged by external thread members 18, 18 ... In this manner, magnetic base portion 1 is covered by covering member 7 except attractive surface 1B and gripping portion 1A.

In uniting covering member 7 with loading article holding member 9, while movable member 9B is opened (see FIG. 14), fixed member 9A of loading article holding portion 9 is mounted on mounting portion 7A so that holding cylinders 9A1, 9A1 ... meet with flange-equipped internal thread members 11, 11. Then external thread members 19, 19 are screwed into respective thread members 11, 11 to complete the joint.

Figure 15:
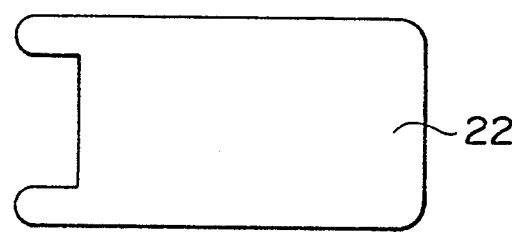
FIG. 15 is an enlarged plan view showing an example of a key used for a carrier of the invention.

FIG. 15 shows a key (card key) 22, which may be made of any material such as resins or metals as long as the material has an appropriate strength and formability. This key is used for unlocking both first locking mechanism 15 and second locking mechanism 16.

A pair of thus constructed automobile roof carriers are attached magnetically onto roof R of automobile A in the same manner as in the prior art product in FIG. 3, one in front and the other in rear side with a predetermined interval therebetween.

Now, the following description will be made on a case where loading article such as skis and the like (not shown) is held between loading article holding portion 9 of the carrier attached on roof R.

Figure 14:
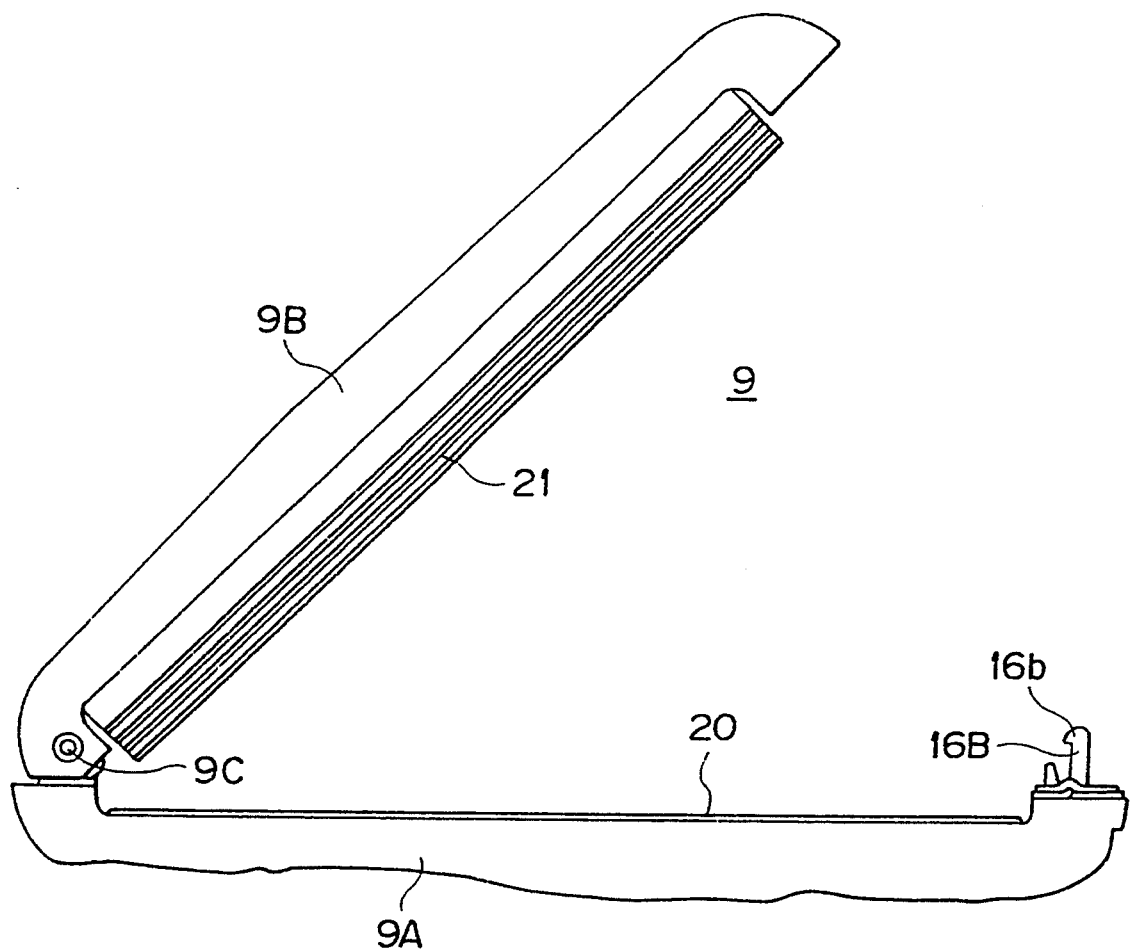
FIG. 14 is a plan view showing a loading article holding portion of a carrier of the invention while the holding portion is being opened.

First of all, key 22 shown in FIG. 15 is inserted into second key-insertion hole 17 formed in fixed member 9A of loading article holding portion 9 shown in FIG. 7. With the insertion of key 22, the front end of key 22 presses the force point side of lever-like latch 16B against the pressure of spring 16A. This causes latch 16B to rotate clockwise and disengage from hook 16C of movable member 9B so as to be unlocked. After the unlocking, movable member 9B is rotated on pin 9C as a rotational center from the closed position to the opened position so that movable member 9B is freed as shown in FIG. 14. Needless to say, it is possible to provide a spring (not shown) which may be used to rotate movable member 9B to be opened automatically when the lock is unlocked. Then, loading article such as skies is set on lower side pad 20 and thereafter movable member 9B is rotated toward the closing position. Just before movable member 9B reaches rotational end in the closing direction, or just before movable member 9B arrives at a locking position of second locking mechanism 16, hook 16C in FIG. 7 interferes in a sliding contact with arc surface 16b formed in the upper operative end portion of latch 16B. By the interference, latch 16B is slightly rotated clockwise against the pressure of spring 16A. At the end of sliding between hook 16C and arc surface 16b, latch 16B returns to the locking position by the pressure of spring 16A. As a result, latch 16B becomes engaged at its lower face of the upper operative end portion with hook 16C to create a locking state. In the locking state, the loading articles can assuredly be held between fixed member 9A and movable member 9B through lower pad 20 and upper pad 21, respectively. That is, attachment of loading articles can be carried out by a simple "single touch" operation of releasing loading article holding portion 9, setting loading articles such as skies on the released loading article holding portion 9 and rotating loading article holding portion 9 to the closing position. The holding state can be assuredly maintained by the engagement of second locking mechanism 16.

Next, description will be followed on a case where loading article such as skis and the like held in loading article holding portion 9 is removed therefrom.

Initially, key 22 is used to unlock in the same manner as in the aforementioned unlocking operation. Then, a simple rotation of movable member 9B from the closed position toward the opening position allows the articles to be released. That is, the attachment and removal of the loading articles can be simplified, and consequently it is possible to greatly improve the operativity in attachment and removal. Further, unless key 22 is used to unlock second locking mechanism 16, the loaded articles cannot be removed from loading article holding portion 9. Therefore, a reliable protection against theft can be provided to improve the security.

In accordance with the present invention, the roof carrier is attached to roof R of automobile A utilizing magnetic attraction of magnetic base portion 1. In this case, gripping portion 1A for removal in magnetic base portion 1 is hidden by auxiliary cover 8, and the hidden state can be maintained using first locking mechanism 15. In other words, unless first locking mechanism 15 is unlocked to open auxiliary cover 8 and thereby expose gripping portion 1A for removal, it is impossible to remove the roof carrier from roof R. Accordingly, it is possible reliably to prevent the theft of the roof carrier to achieve an increased safety.

When the roof carries is not used, the carrier can be removed from roof R of automobile A. In this operation, key 22 is inserted from first key insertion hole 13 as shown in FIG. 6, FIGS. 12A and 12B and FIGS. 13A and 13B, so that the front end of key 22 presses latch 15A of first locking mechanism 15 against the pressure of an unillustrated spring. This shift of latch 15A in a direction of arrow w1 disengages the interlock between the operative end portion of latch 15A and hook 14 formed integrally with auxiliary cover 8 so as to unlock the engagement. After the release, auxiliary cover 8 is rotated on pins 12, 12 as a rotational center from the closed position to the opened position so that gripping portion 1A or 1C for removal can be exposed. Needless to say, it is possible to provide a spring (not shown) which allows auxiliary cover 8 to be opened automatically when the lock is released. When gripping portion 1A or 1C for removal has been exposed, an operator can grip and pull up the gripping portion 1A or 1C by his/her fingers. Continuing the pulling up operation, the attracted area of magnetic base portion 1 to roof R can be reduced gradually to detach the carrier from roof R.

On the other hand, opened auxiliary cover 8 may be rotated toward the closing position. In this closing, just before auxiliary cover 8 reaches rotational end in the closing direction, or just before first locking mechanism 15 completes the locking engagement, hook 14 in FIG. 12A or 12B interferes in a sliding contact with bevel 15a formed on the upper side of an operative end of latch 15A. By the interference, latch 15A is slightly displaced in a direction of arrow w1 against the pressure of an unillustrated spring. At the completion of sliding between hook 14C and bevel 15a, latch 15A returns to the locking position by the pressure of the spring. As a result, latch 15A is engaged with hook 14 to assure the locking state.

Although the above description of the embodiment has been made as to the attachment of skies to loading article holding portion 9, other long size articles such as surfboards, long size poles and the like may be held as mentioned above.

As has been described heretofore, in accordance with the present invention, the attachment of loading articles to the roof carrier can be carried out by a simple "single touch" operation of releasing loading article holding portion, setting loading articles such as skies on the released loading article holding portion and rotating the loading article holding portion to the closing position. On the other hand, removal of loaded articles can be carried out simply by allowing the release of the loading article holding portion by unlocking the second locking mechanism with the unlocking key so that the loading article holding portion may be opened. Thus, the operation and handling can be simplified, so that the operativity in attachment and removal of loading articles can be greatly improved.

Further, the gripping portion for removal is hidden by the auxiliary cover, and the hidden state can be locked and maintained using the first locking mechanism. Therefore, it is possible to reliably prevent the roof carrier from being stolen and thereby achieve improved safety. Moreover, the holding state for the loaded articles held by the loading article holding portion can be maintained by the second locking mechanism, it is possible to reliably prevent the loaded articles from being stolen and thereby achieve improved safety.

Figure 16:
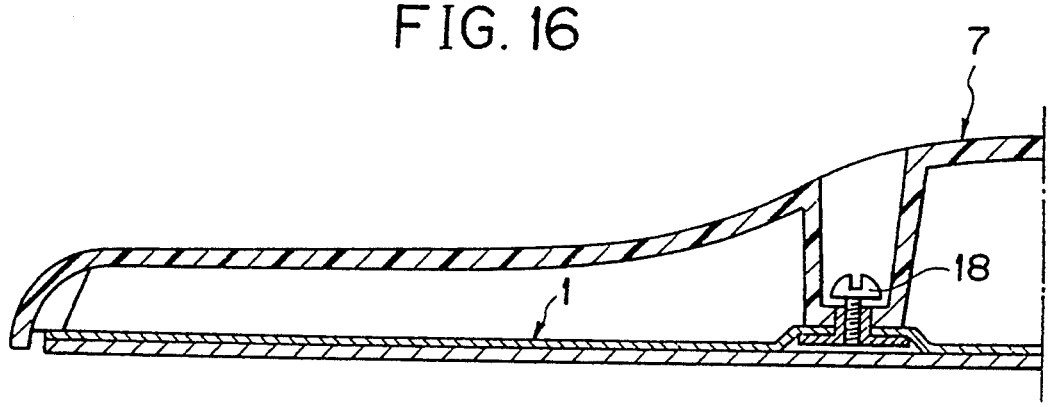
FIG. 16 is a partial sectional view schematically illustrating a joining structure between a magnetic base portion and a covering member in a carrier of the invention.
Figure 17:
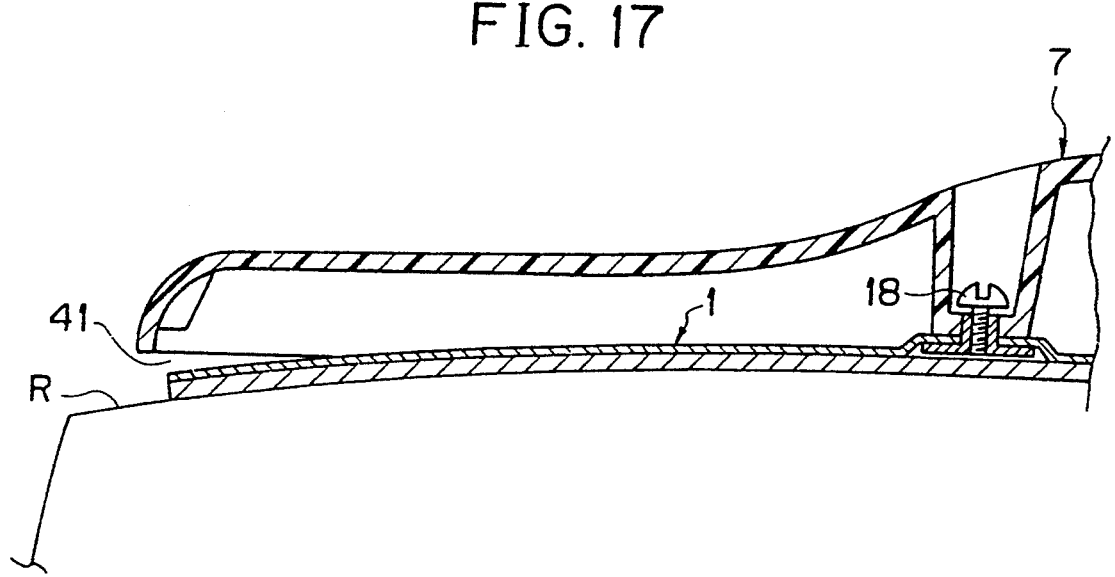
FIG. 17 is a partial sectional view schematically illustrating a possible attracted state in a peripheral portion of a carrier of the invention.

Meanwhile, the roof carrier of this type has an integrated structure in which magnetic base portion 1 and covering member 7 are joined only with joints at or around the central portion thereof as described above. That is, in the integrative structure in which magnetic base portion 1 and covering member 7 are Joined with a plurality of external threads 18 (only one thread 18 is shown in FIG. 16) around the central portion thereof, magnetic base portion 1, curving along the curved surface of roof R, comes in uniform contact therewith. Nevertheless, the curvature of magnetic base portion 1 cannot be carried over to the peripheral side of covering member 7. Therefore, the covering member 7 is left retaining its original form, so that clearance 41 in the periphery between covering member 7 and magnetic base portion 1 might occur. Consequently, the roof carrier is mounted on roof R while the peripheral part of magnetic base portion 1 remains exposed outside.

This exposure not only deteriorates the outer appearance of the roof carrier when it is used, but also increases the air resistance at driving. Further, there might be a possibility of reduction of the magnetic attractive force in magnetic base portion 1 of the roof carrier. More clearly, the air flow over covering member 7 creates a negative pressure, and an air pressure is loaded by the air that flows into clearance 41 toward the lower face of covering member 7. As a result, a lift will be created by the combination. The combined lifting force of the negative pressure and the air pressure might weaken the magnetic attractive force of magnetic base portion 1.

Figure 18:
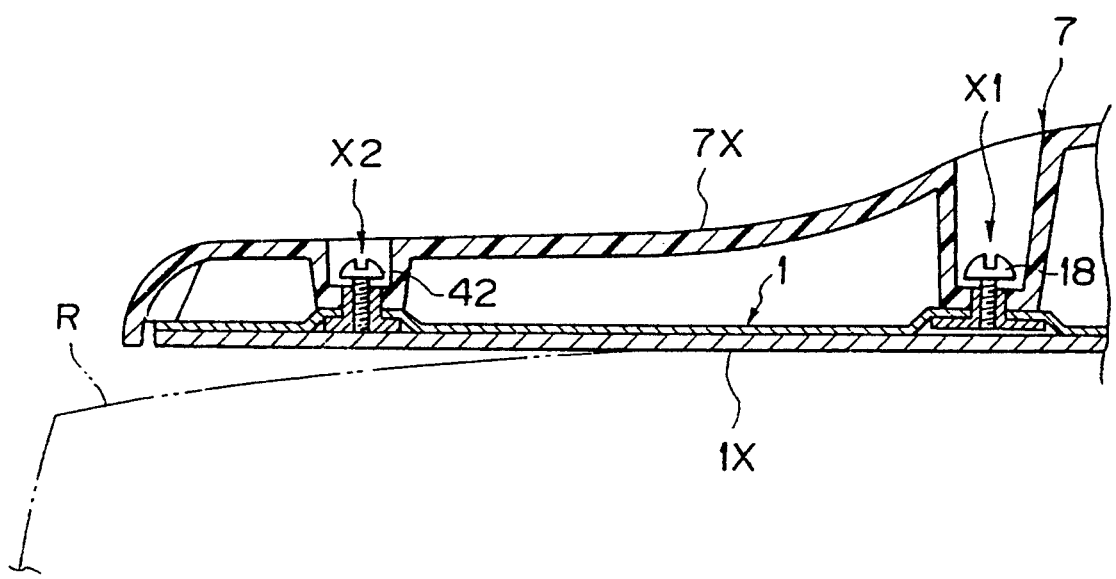
FIG. 18 is a partial sectional view showing another possible attracted state in a peripheral portion of a carrier of the invention.

In order to prevent the occurrence of such inconvenience, a structure can be considered in which, as shown in FIG. 18, magnetic base portion 1 and covering member 7 are Jointed integrally by uniting therebetween at the periphery using a plurality of external threads 42 (only one thread 42 is shown in FIG. 18) as well as using at around the central portion with a plurality of external threads 18 (only one thread 18 is shown in FIG. 18).

In the thus constructed jointing structure, a closed cross-sectional structure will be formed by the uniting joint portion X1 formed by a plurality of external threads 18, the uniting joint portion X2 formed by a plurality of external threads 42, covering member 7X existing between uniting joint portions X1 and X2 and magnetic base portion 1X existing between uniting joint portions X1 and X2. Therefore, the rigidity of the section is increased greatly. As a result, even if magnetic base portion 1X is tried to be curved in order to bring the base portion into uniform contact with the curvature of roof R of automobile A shown by an imaginary line, the closed sectional structure having high rigidity disturbs deformation or curving of magnetic base portion 1 and covering member 7. Consequently, the contacted area to roof R might be reduced greatly.

Accordingly, magnetic attraction force exerted by magnetic base portion 1 might be weakened due to the air resistance as the automobile drives.

Figure 19:
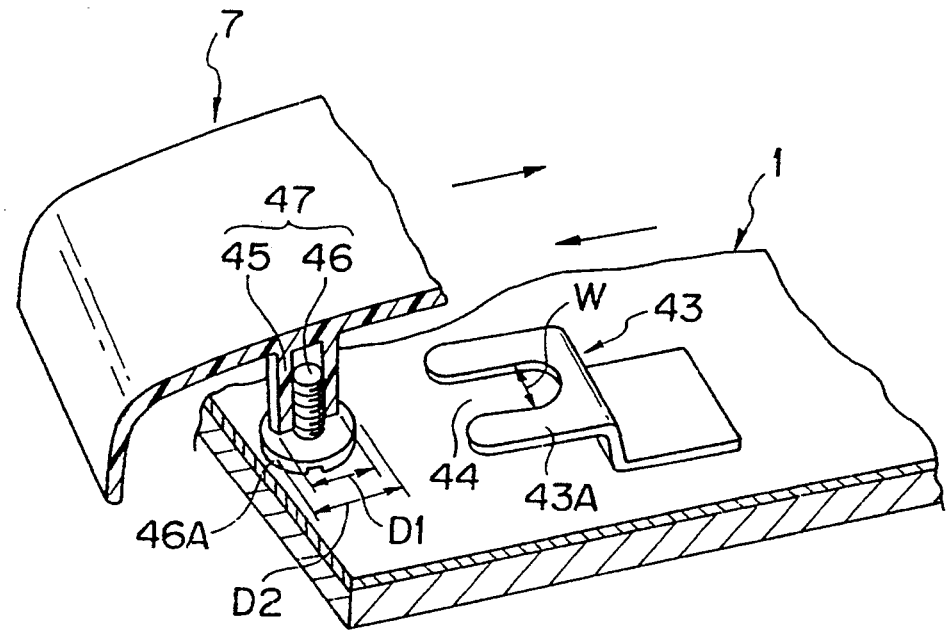
FIG. 19 is a perspective exploded view showing elementary components in the vicinity of a jointing structure used in the present invention.
Figure 20:
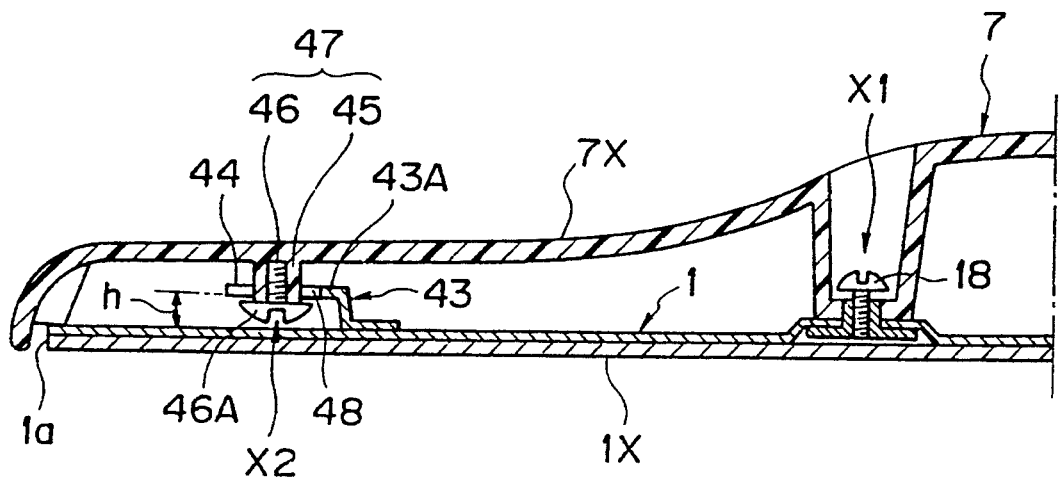
FIG. 20 is a partial sectional view showing an embodiment of an assembled state of a magnetic base portion and covering member using a jointing structure in a carrier of the invention.

To deal with this, the present invention also proposes means for inhibiting such inconvenience. FIG. 19 is a perspective, exposed view partially showing elemental components of the present invention. FIG. 20 is a partial sectional showing an assembled state. Here, identical or corresponding parts with those in the aforementioned FIGS. 4 through 20 or FIGS. 1 through 3 will be allotted by the same reference numerals and the detailed description will be omitted.

Figure 21:
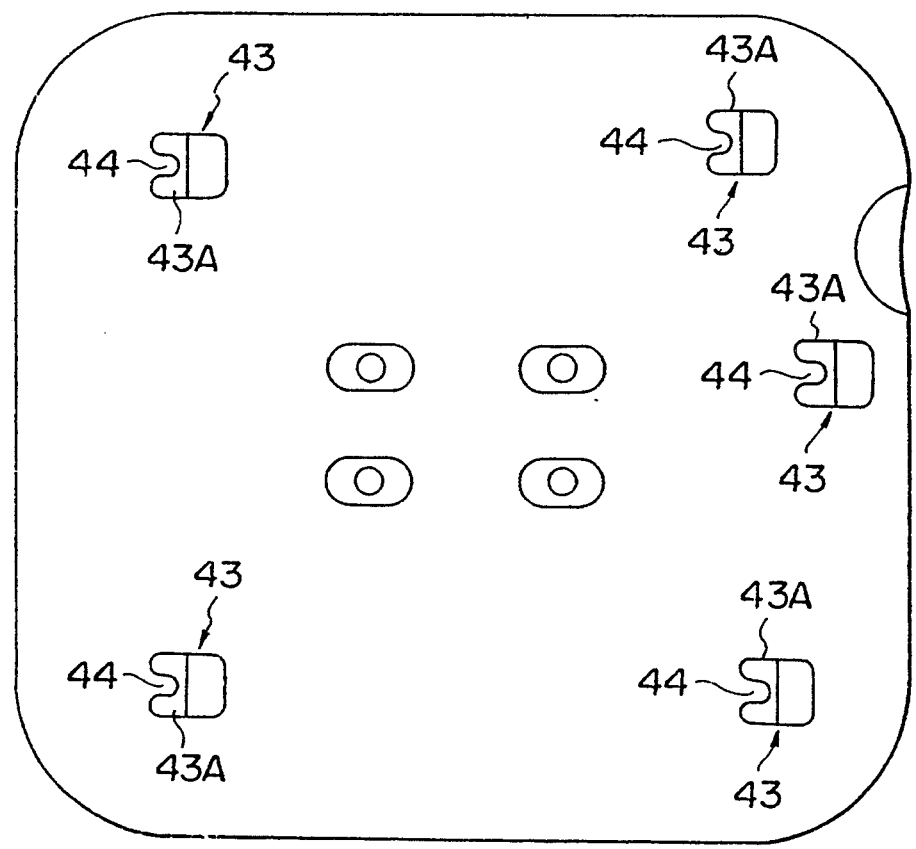
FIG. 21 is a plan view showing an example of a magnetic base portion used in a carrier of the invention.

Referring to FIGS. 19 and 20, a first jointing member 43 is securely fixed by the spot-welding on an upper side of magnetic base portion at the periphery. The first jointing member 43 has a catching portion 43A that faces to and is spaced by a distance 'h' from the upper surface of magnetic base portion 1. The catching portion 43A is formed by a fork, having branches oriented to a periphery 1a of magnetic base portion 1 with a cutout portion 44 therebetween and extending parallel to magnetic base portion 1. As shown in FIG. 21, five pieces of first jointing members 43 are provided on the upper surface in the periphery of magnetic base portion 1.

Corresponding to cutout portion 44 of each catching portion 43A, a boss element 45 is projected downward from the under surface of covering member 7 as shown in FIGS. 19 and 20. A screw bolt 46 is fit into the internal thread portion of boss element 45. The combination of boss element 45 and screw bolt 46 constitutes a second jointing member 47. The outer diameter D1 of boss element 45 is set slightly smaller than the width W of cutout portion 44. Therefore, there is formed a clearance 48 between the inside periphery of cutout portion 44 formed in catching portion 43A of first jointing member 43 and the outside periphery of boss element 45. The outer diameter D2 of the head 46A of screw 46 is made larger than the outer diameter D1 of boss element 45 so as to provide a function as an interfering portion.

Accordingly, in assembling magnetic base portion 1 with covering member 7, at first, as shown in FIG. 19, the opening in cutout portion 44 of catching portion 43A is made to meet with boss element 45, and thereafter magnetic base portion 1 and covering member 7 are shifted relatively in respective directions shown by arrows. After boss element 45 is positioned in cutout portion 44 of catching portion 43A, as shown in FIG. 20, a plurality of external thread screws 18 (only one external thread screw 18 is depicted in FIG. 20) are fixed around the central portion of magnetic base portion 1 and covering member 7 in order to form these items into one body structure. By this operation, clearance 48 extending in a semicircular range is formed between the inside periphery of cutout portion 44 and the outside periphery of boss element 45.

In the jointing structure of the invention, magnetic base portion 1 and covering member 7 are coupled one another at their periphery by the combination of first jointing member 43 and second joining member 47 while clearance 48 is provided between the two members. More specifically, there is formed clearance 48 extending across a semicircular range between the inside periphery of cutout portion 44 formed in catching portion 43A of first jointing member 43 and the outside periphery of boss element 45. Therefore, no closed sectional structure is created along integrally uniting portion X1 around the central portion of magnetic base portion 1 and covering member 7, the part of covering member 7X existing between first integrally uniting portion X1 and second integrally uniting portion X2, second integrally uniting portion X2 formed by first jointing member 43 and second jointing member 47 and the part of magnetic base portion 1 existing between second integrally uniting portion X2 and first integrally uniting portion X1. As a result, the flexibility of covering member 7 can be retained, and further, the relative shift between first jointing member 43 and second jointing member 47 can be absorbed by clearance 48.

Figure 22:
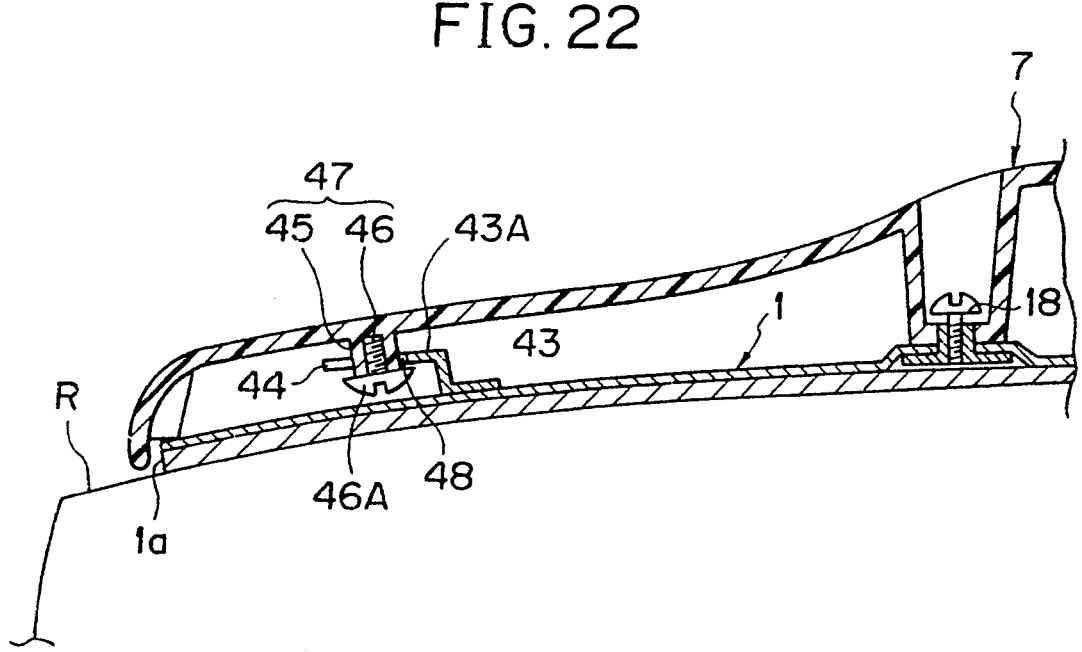
FIG. 22 is a partial sectional view schematically illustrating an exemplary attracted state in the periphery where a jointing structure of a carrier of the invention is used.

Accordingly, as shown in FIG. 22, when the carrier is used, the periphery of magnetic base portion 1 is curved along the curvature of roof R to be brought into uniform contact therewith. In this case, the curvature is transferred from catching portion of first jointing member 43 to an interfering portion of second jointing member 47, or a head 46A of screw 46, and consequently the peripheral side of covering member 7 is pulled down. Covering member 7 itself has its own flexibility so that it may arch following the curvature of magnetic base portion 1. As a result, there occurs no clearance 41 (see FIG. 17) which would have arisen between covering member 7 and magnetic base portion 1 around their periphery. In other words, even when the curvature of curved surface of roof R may change depending upon the make or the model of automobiles, the roof carrier of the invention can be mounted on the roof without exposing the periphery of magnetic base portion 1.

Accordingly, the roof carrier is not degraded in appearance when it is used. No increment in air resistance occurs either when the automobile drives. Moreover, the roof carrier is never influenced or disturbed by the combined lifting force, that is, the negative pressure that would be created by the air flow over covering member 7 and the air pressure that would be loaded by the air that flows into clearance 41 toward the lower face of covering member 7. Needless to say, no disturbance in bending of magnetic base portion 1 and covering member 7 does not occur, this means that no contact area with roof R would be reduced significantly.

Thus, the roof carrier according to the present invention is improved in security and can prevent the loaded articles and the roof carrier itself from being stolen while the appearance is not degraded when it is used. Further, neither does increment of the air flow resistance at driving nor reduction of contact area with the roof take place. Accordingly, the roof carrier can be mounted in tune with variation in curvature of curved surfaces of roof R.

Figure 23:
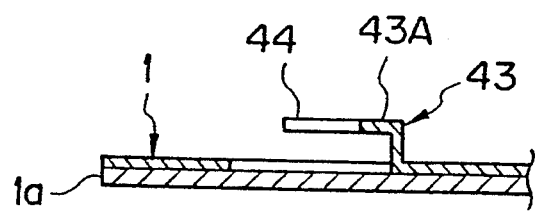
FIG. 23 is a sectional view showing a variational example of a first jointing structure used in a carrier of the invention.
Figure 24:
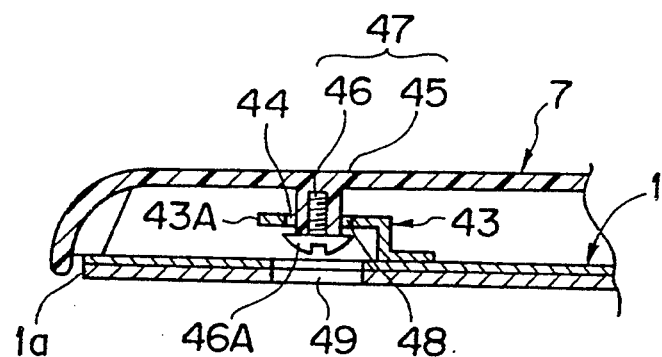
FIG. 24 is a sectional view showing another variational example of a first jointing structure used in a carrier of the invention.
Figure 25:
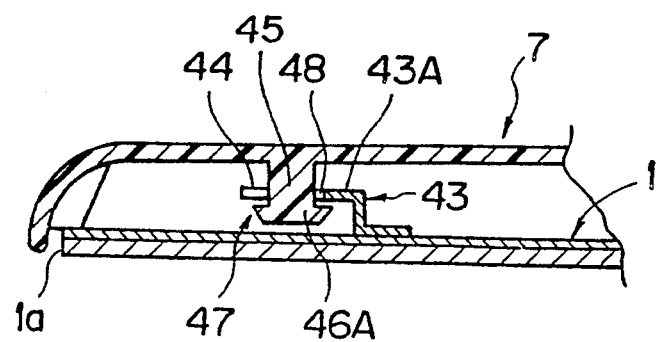
FIG. 25 is a sectional view showing a variational example of a second jointing structure used in a carrier of the invention.

In the above embodiment, although description has been made on the configurations in which first jointing member 43 having catching portion 43A is formed of a fork with cutout portion 44 and second jointing member 47 is formed of boss element 45 and screw bolt 46 fit into boss element 45, it is also possible to construct a second jointing member 47 by insert-forming a bolt 46 into boss element 45. On the other hand catching portion 43A made of a fork may be formed by cutting and press-forming as shown in FIG. 23. Further, as shown in FIG. 24, a catching portion 43A of first jointing member 43 may be constructed with a cutout 44 of a circular through-hole. In this case, in order to couple first jointing member 43 with second jointing member 47 a manual tool inserting hole 49 for introducing bolt 46 and screw driver should be formed at a position corresponding to circular cutout portion 44. Alternatively, as shown in FIG. 25, projecting downward from the lower face of covering member 7, boss element 45 and interfering portion 46A may be integrally formed to construct second jointing member 47, so that thus formed second jointing member 47 is coupled with first jointing member 43 having catching portion 43A of the fork with cutout portion 44.

Although, in the above description of the embodiments, skis has been used as a typical example of the article to be loaded on loading article holding portion 9, it should be understood that surfboards, long size poles and any other long size articles can be held.

As described heretofore, the roof carrier according to the present invention is improved in security and can prevent the loaded articles and the roof carrier itself from being stolen in an assuring manner, still the appearance is not degraded when it is used. Further, increment of the air flow resistance at driving and reduction of contact area with the roof is prevented so that the roof carrier can be mounted in fit with curvature of any curved roof surface.

What is claimed is:

1. An automobile roof carrier comprising:
   a magnetic base portion, magnetically attracted onto an upper surface of a roof of an automobile;
   a gripping portion for removal formed in an appropriate position of said magnetic base portion;
   a covering member, disposed over said magnetic base portion and integrally united therewith so as to cover the portion other than the attracted surface of said magnetic base portion and said gripping portion for removal;
   a loading article holding portion, disposed above said covering member, integrally jointed thereto and having means to be opened and closed to hold articles;
   an auxiliary cover attached to said covering member so as to be opened and closed for lidding said gripping portion for removal from the top;
   a first locking mechanism disposed in said auxiliary cover to be locked for maintaining the closed state of said auxiliary cover when said auxiliary cover is closed;
   a second locking mechanism disposed in said loading article holding portion to be locked for maintaining the closed state of said loading article holding portion when said loading article holding portion is closed; and
   a common key for unlocking said first and second locking mechanisms.

2. An automobile roof carrier according to claim 1, wherein said loading article is skis.

3. An automobile roof carrier comprising:
   a magnetic base portion, magnetically attracted onto an upper surface of a roof of an automobile;
   a gripping portion for removal formed in an appropriate position of said magnetic base portion;
   a covering member, disposed over said magnetic base portion and integrally united therewith so as to cover the portion other than the attracted surface of said magnetic base portion and said gripping portion for removal;
   a loading article holding portion, disposed above said covering member, integrally jointed thereto and having means to be opened and closed to hold articles;
   an auxiliary cover attached to said covering member so as to be opened and closed for lidding said gripping portion for removal from the top;
   a first locking mechanism disposed in said auxiliary cover to be locked for maintaining the closed state of said auxiliary cover when said auxiliary cover is closed;
   a second locking mechanism disposed in said loading article holding portion to be locked for maintaining the closed state of said loading article holding portion when said loading article holding portion is closed;
   a common key for unlocking said first and second locking mechanisms;
   a plurality of first jointing members each having catching means formed with a cutout portion, and disposed in appropriate, peripheral positions on said magnetic base portion; and
   a plurality of second jointing members, disposed on the under surface of said covering member in positions corresponding to said respective first jointing members, extending downward, each constructed of a boss element and an interfering element attached to the lower end of said boss element,
   characterized in that said corresponding pairs of first and second jointing members are engaged such that said boss portions are inserted into said respective cutout portions when said magnetic base portion and said covering member are united integrally, and in each pair of said jointing members a clearance in a radial direction of said boss element between the inside edge of said cutout portion and the outside edge of said boss element is created across at least semicircular range.

4. An automobile roof carrier according to claim 3, wherein said loading article is skis.

* * * * *